United States Patent Office 3,660,387
Patented May 2, 1972

3,660,387
1H-3,4-DIHYDRO-2,3-BENZOXAZINE DERIVATIVES
Giorgio Piffert and Pierfranco Schiatti, Milan, Italy, assignors to Gruppo Lepetit S.p.A., Milan, Italy
No Drawing. Filed Dec. 24, 1968, Ser. No. 786,775
Claims priority, application Great Britain, Feb. 2, 1968, 5,502/68
Int. Cl. C07d 87/12
U.S. Cl. 260—244 R          10 Claims

ABSTRACT OF THE DISCLOSURE

The invention relates to benzoxazines having in the 3-position hydrogen, lower alkyl, dialkylaminoalkyl, aralkyl carbamoyloxyalkyl, alkyl substituted by a heterocyclic ring, hydroxyalkyl, acyloxyalkyl, acyl, amidino, carbamoyl, arylcarbamoyl or nitroso, the 6- or 7-position being substituted by halogen, nitro or amino. Various procedures are described for preparing the 3-unsubstituted-6(7)-substituted benzoxazines as well as the 3-substituted compounds, both by single step and multi-step introduction of substituents into the 3- and 6(7)-positions, and by ring closure reactions of ortho-disubstituted halogeno or nitro benzene. The compounds have anti-inflammatory activity and are active also on the central nervous system.

---

This invention is concerned with a new class of compounds and with a method for preparing them. More particularly, the compounds of the invention are benzoxazines of the formula

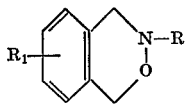

wherein R is a member of the class consisting of hydrogen, lower alkyl, dialkylaminoalkyl, aralkyl, carbamoyloxyalkyl, alkyl substituted with a heterocyclic ring, hydroxyalkyl, acyloxalkyl, acyl, amidino, carbamoyl, arylcarbamoyl and nitroso groups, $R_1$ is linked to the benzene ring in position 6 or 7 and is selected from the class consisting of halogen, nitro and amino.

The process for preparing the compounds of the invention, with the obvious exception of the 3-unsubstituted-6(7)-nitro (or chloro)-benzoxazines, the synthesis of which is outlined later on, starts from a 3-unsubstituted benzoxazine of the formula:

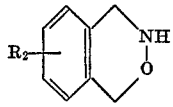

wherein $R_2$ represents halogen and nitro, in which the radical R is introduced according to conventional methods.

For instance the 3-alkyl derivatives can be prepared by reacting compound II with an alkyl halide, or a compound containing a double or triple bond, or a mixture of formaldehyde and formic acid.

An alkylene oxide can be employed for preparing the hydroxyalkyl derivatives.

The acylation with carboxylic acid anhydrides and halides affords the corresponding 3-acyl benzoxazines in good yields. If isocyanates are employed, the carbamoyl or substituted carbamoyl derivatives are obtained. The 3-nitroso derivatives are synthesized by contacting compound II with nitrous acid in an aqueous medium, while an amidino group is introduced by refluxing said compound II with cyanamide. When a 6- or 7-nitro-3-substituted benzoxazine is obtained according to the above described process, this compound can be optionally converted into the corresponding amino derivative by hydrogenation in the presence of a metal such as nickel, palladium and platinum as the catalyst.

The 3-unsubstituted-6(7)-amino-benzoxazine may be prepared easily from the corresponding 3-substituted compounds through conventional methods. For instance good yields were obtained by hydrolytic cleavage of the 3-acyl-substituent with hydrochloric acid.

Obvious alternative routes of the process, herein described and claimed, are intended to fall within the scope of this invention. For instance it will be entirely obvious to any people skilled in the field of chemical preparations, that the radical R, instead of being introduced in the heterocyclic ring by a single-stage reaction, can be built through obvious modifications of a radical already present in position 3.

The initial compound II can be prepared, in its turn, through a synthesis which starts from 3-acetyl-1H-3,4-dihydro-2,3-benzoxazine (A), which is nitrated at low temperature with potassium nitrate and sulfuric acid. The reaction affords a mixture of the isomers 6-nitro- and 7-nitro-3-acetyl-1H-3,4-dihydro-2,3 - benzoxazine (B' and B"), which are separated by fractional crystallization and desacetylated in acidic medium respectively to 6(7)-nitro-1H-3,4-dihydro-2,3-benzoxazine (C' and C"). Low pressure catalytic reduction of compounds B with hydrogen, in the presence e.g. of palladium as the catalyst, leads to the formation of 3-acetyl-6(7)-amino-1H-3,4-dihydro-2,3-benzoxazine(D), which is converted by the Sandmeyer reaction into 3-acetyl-6(7)-chloro-1H-3,4-dihydro-2,3-benzoxazine(F). By acid hydrolysis compound F is converted into 6(7)-chloro-1H-3,4-dihydro-2,3-benzoxazine.

In order to better illustrate the above process we report in the following the flow diagram of the process.

Scheme 1

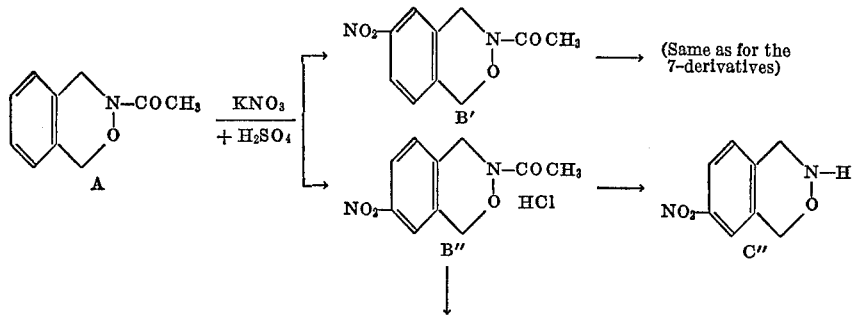

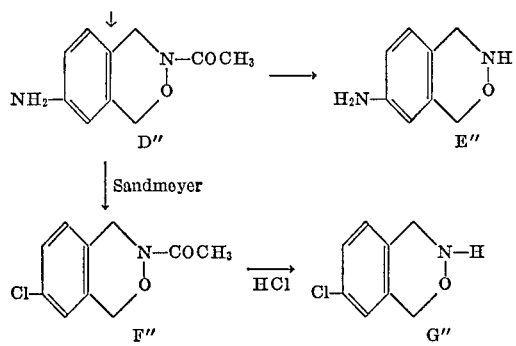

An alternative method for preparing Compound II is represented in scheme 2, wherein the symbols R and R₂ have the above significance. The process starts from a 4-substituted α,α'-dibromo-o-xylene of Formula M which is refluxed with an about equimolecular amount of N-hydroxyurethan, in the presence of an excess of an alkali metal hydroxide. An anhydrous lower alkanol is used as the solvent. The carbethoxy group is then split off by hydrolytic cleavage, using an alkali metal hydroxide whereby a mixture of the two isomers of Formula O, having the radical R₂ in position 6 or 7 is obtained. The separation of the isomers is achieved according to well known techniques, such as fractional crystallization.

Scheme 2

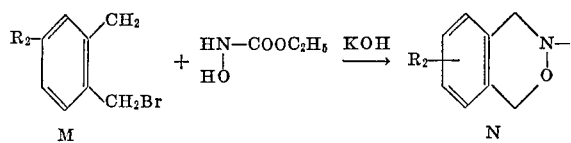

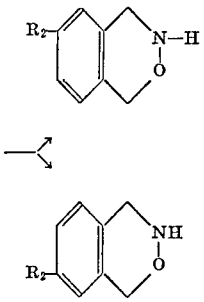

The compounds of the invention have pharmacological interest, as anti-inflammatory agents. They further proved to be active on the central nervous system.

The former activity was evaluated through the granuloma pellet test in rats. The results are summarized in Table 1, wherein the $LD_{50}$ is also given for a better evaluation of the safety of therapeutic index. The data are compared with the ones relating to a known anti-inflammatory compound, i.e. phenylbutazone.

TABLE 1

| Compound | $LD_{50}$, mg./kg. (mice, per os) | Dosage, mg./kg. (rats, per os) | Granuloma pellet percent decrease (normal rats) |
|---|---|---|---|
| 3-carbamoyl-6-chloro-1H-3,4-dhiydro-2,3-benzoxazine. | >1,000 | 100<br>25 | −32.1<br>−19.8 |
| 3-amidino-6-chloro-1H-3,4-dihydro-2,3-benzoxazine. | >1,000 | 100<br>50<br>25 | −34.0<br>−27.2<br>−24.7 |
| 3-methyl-7-chloro-1H-3,4-dihydro-2,3-benzoxazine. | >1,000 | 100<br>50<br>25 | −36<br>−33.5<br>−24.6 |
| 3-(2-diethylaminoethyl)-6-nitro-1H-3,4-dihydro-2,3-benzoxazine. | >1,000 | 100<br>50<br>25 | −29.8<br>−28.9<br>−17.4 |
| 3-(pyridinoethyl)-7-nitro-1H-3,4-dihydro-2,3-benzoxazine. | 850 | 100<br>25 | −34.1<br>−26.7 |
| 3-(4-isobutylphenylacetyl)-7-nitro-1H-3,4-4-dihydro-2,3-benzoxazine. | >1,000 | 100<br>50<br>25 | −26.1<br>−22.4<br>−20.5 |
| 3-methyl-6-amino-1H-3,4-dihydro-2,3-benzoxazine. | >1,000 | 100<br>50<br>25 | −34.1<br>−28.6<br>−18.4 |
| 3-methyl-7-amino-1H-3,4-dihydro-2,3-benzoxazine. | >1,000 | 100<br>50<br>25 | −27.6<br>−21.0<br>−19.5 |
| 3-(4-isobutylphenylacetyl)-7-amino-1H-3,4-dihydro-2,3-benzoxazine. | >1,000 | 100<br>50<br>25 | −28.0<br>−26.0<br>−19.5 |
| Phenylbutazone | 286 | 100<br>50<br>25 | −39.9<br>−31.4<br>−25.3 |

It is apparent from Table 1 that the therapeutic index is largely in favour of the new compounds in comparison with phenylbutazone.

The following non limitative examples illustrate the invention.

EXAMPLES 1–2

Preparation of 7-chloro-1H-3,4-dihydro-2,3-benzoxazine (A) A solution of 0.45 g. of 3-acetyl-7-nitro-1H-3,4-dihydro-2,3-benzoxazine, prepared as described in Example 19, in 110 ml. of ethanol is hydrogenated at normal pressure and room temperature with 0.1 g. of 5% palladium on charcoal. The catalyst is filtered off, the filtrate is concentrated in vacuo and the residue crystallized from ethanol. Yield 0.26 g. (79%) of 3-acetyl-7-amino-1H-3,4-dihydro-2,3-benzoxazine; M.P. 143–144° C.

A solution of 1.35 g. of 3-acetyl-7-amino-1H-3,4-dihydro-2,3-benzoxazine in 16 ml. of 15% HCl is diazotized at 0° C. with a solution of 0.58 g. of sodium nitrite in 5 ml. of water. The mixture is stirred for 10 minutes at 0° C., treated with a small amount of urea, then 28 ml. of a 15% solution of $Cu_2Cl_2$ are added. After stirring for 10 minutes at room temperature, the precipitate is collected, washed with water and crystallized from ethanol. Yield 1.04 g. of 3-acetyl-7-chloro-1H-3,4-dihydro-2,3-benzoxazine (70%); M.P. 134° C.

A mixture of 0.3 g. of 3-acetyl-7-chloro-1H-3,4-dihydro-2,3-benzoxazine and 6 ml. of 18% HCl is heated at 100° C. for 2 hours, then concentrated to dryness. The residue is dissolved in water and contacted with an aqueous solution of sodium bicarbonate. A precipitate, consisting of 7-chloro-1H-3,4-dihydro-2,3-benzoxazine is obtained. Yield 0.27 g. (90%); M.P. 91–92° C.

The isomer 6-chloro-1H-3,4-dihydro-2,3-benzoxazine is prepared by the same procedure, starting from 3-acetyl-6-amino-1H-3,4-dihydro-2,3-benzoxazine.

(B) The above 6 and 7-chloro-1H-3,4-dihydro-2,3-benzoxazines can be alternatively prepared according to the following method.

To a stirred solution of 30 g. of 4-chloro-α,α'-dibromo-o-xylene in 120 ml. of ethanol, a solution of 16 g. of crude N-hydroxyurethan (purity 80%) and 11.3 g. of potassium hydroxide in 240 ml. of ethanol are slowly added. The mixture is refluxed for 3 hours, then cooled and filtered from the precipitated potassium bromide. The filtrate is concentrated and the residue is taken up with diethyl ether, washed with 5% aqueous sodium hydroxide, then with water, and finally dried over sodium sulphate. After removing the solvent with the aid of vacuum, 23.5 g. of an oily residue is obtained, which is chromatographed on a silica gel column using benzene-acetone (97:3) as the eluent. The central fractions are collected, and the solvent distilled off. The residue is distilled in vacuo, to give 11 g. (45%) of a mixture of 6- and 7-chloro-3-carbethoxy-1H-3,4-dihydro-2,3-benzoxazine, B.P. 130° C./0.2 mm. Hg.

A solution of 4.15 g. of potassium hydroxide in 13 ml. of water is added to 10 g. of the above mixture of isomers, dissolved in 82 ml. of ethanol and the whole is refluxed for 90 minutes. After concentrating in vacuo, the residue is suspended in water and extracted with diethyl ether. By adding an ether solution of hydrogen chloride, a mixture of 6- and 7-chloro-1H-3,4-dihydro-2,3-benzoxazine hydrochloride precipitates, which is collected and recrystallized from ethanol. Yield 4.78 g. (56%).

The separation of the two isomers is achieved by fractional crystallization from ethanol. From 8 g. of the above mixture 4.08 g. (51%) of 6-chloro-1H-3,4-dihydro-2,3-benzoxazine hydrochloride and 1.44 g. (18%) of 7-chloro-1H-3,4-dihydro-2,3-benzoxazine hydrochloride are obtained M.P. respectively 64° C. and 91–92° C.

The hydrochlorides can be converted into the corresponding bases by conventional route.

EXAMPLE 3

Preparation of 3-methyl-6-chloro-1H-3,4-dihydro-2,3-benzoxazine

A solution of 3.5 g. of 6-chloro-1H-3,4-dihydro-2,3-benzoxazine in 10.43 ml. of formic acid and 2.9 ml. of 38% formic aldehyde is heated at 90° for 6 hours. The excess of formic acid is then removed in vacuo, and the residue taken up with water. The oily precipitate is extracted with methylene chloride, washed with water and dried over sodium sulphate. After evaporation of the solvent, the residue is distilled, to give 2.8 g. (73%) of 3-methyl-6-chloro-1H-3,4-dihydro-2,3-benzoxazine. B.P. 80° C./0.15 mm. Hg.

EXAMPLE 4

Preparation of 3-methyl-7-chloro-1H-3,4-dihydro-2,3-benzoxazine

Prepared as described in Example 3, starting from 3.2 g. of 7-chloro-1H-3,4-dihydro-2,3-benzoxazine. Yield 56% M.P. 66–67° C.

EXAMPLE 5

Preparation of 3-(4-pyridinoethyl)-6-chloro-1H-3,4-dihydro-2,3-benzoxazine

An amount of 2.05 g. of 6-chloro-1H-3,4-dihydro-2,3-benzoxazine hydrochloride and 1.15 g. of 4-vinyl-pyridine in 50 ml. of ethanol are refluxed for 3 hours. The solution is then concentrated to ½ its volume and cooled overnight on ice. The precipitate is collected and recrystallized from ethanol, to give 2.65 g. (85.6%) of 3-(4-pyridinoethyl) - 6-chloro-1H-3,4-dihydro-2,3-benzoxazine hydrochloride; M.P. 167–168° C.

EXAMPLE 6

Preparation of 3-(2-hydroxyethyl)-7-chloro-1H-3,4-dihydro-2,3-benzoxazine

To 100 ml. of methanol 4 g. of ethylene oxide and 4.5 g. of 7-chloro-1H-3,4-dihydro-2,3-benzoxazine are added. The mixture is allowed to stand at room temperature for 2 hours, then refluxed for 3 hours. The solvent is then removed in vacuo and the residue is recrystallized from 50 ml. of a 1:1 mixture of hexane/isopropyl ether, to give 4.05 g. (71.5%) of 3-(2-hydroxyethyl)-7-chloro-1H-3,4-dihydro-2,3-benzoxazine; M.P. 91–93° C.

EXAMPLE 7

Preparation of 3-(2-carbamoyloxyethyl)-7-chloro-1H-3,4-dihydro-2,3-benzoxazine

To 30 ml. of chloroform 1.85 g. of 3-(2-hydroxyethyl)-7 - chloro - 1H - 3,4 - dihydro - 2,3 - benzoxazine and 1.5 g. of sodium cyanate are added.

A stream of hydrogen chloride is then bubbled through the mixture, previously cooled to 0–5° C. during 30 minutes. The mixture is allowed to stand for 15 minutes longer, then 30 ml. of 5% sodium hydroxide are added, and the formed crystals are collected. A second crop can be obtained by washing the organic phase with water and distilling off the chloroform. The combined crops are recrystallized from ethanol, to give 1.75 g. (78%) of 3-(2-carbamoyloxyethyl) - 7 - chloro - 1H-3,4-dihydro-2,3-benzoxazine, M.P. 158–159° C.

EXAMPLE 8

Preparation of 3-(2-chloroethyl)-7-chloro-1H-3,4-dihydro-2,3-benzoxazine

A solution of 0.95 g. of 3-(2-hydroxyethyl)-7-chloro-1H-3,4-dihydro-2,3-benzoxazine is saturated with hydrogen chloride, then 3.3 ml. of thionyl chloride in 10 ml. of benzene are added. The mixture is refluxed for 1.5 hours, allowed to cool, then the solvent is distilled off in vacuo. The residue is dissolved in diethyl ether, washed with water, the organic phase is separated and dried over sodium sulphate. After removing the solvent an oily residue is obtained, consisting of 3-(2-chloroethyl)-7-chloro-1H-3,4-dihydro-2,3-benzoxazine. Yield 1 g. (96.8%).

The product is converted into the corresponding hydrochloride by dissolving the base in diethyl ether, and precipitating with hydrogen chloride. The collected crystals decompose at about 140° C., with no definite melting point.

EXAMPLE 9

Preparation of 3-(2-piperidinoethyl)-7-chloro-1H-3,4-dihydro-2,3-benzoxazine

An amount of 0.95 g. of 3-(2-chloroethyl)-7-chloro-1H-3,4-dihydro-2,3-benzoxazine dissolved in 8 ml. of piperidine is refluxed for 5 hours. The solvent is then evaporated in vacuo, and the residue is taken up with diluted hydrochloric acid. After washing with diethyl ether, the aqueous phase is made alkaline by adding a 50% solution of sodium hydroxide. The free base is extracted three times with diethyl ether, and the combined organic layers are washed with water, then dried over sodium sulphate. After distilling off the ether, a residue is obtained, consisting of 3-(2-piperidinoethyl)-7-chloro-1H-3,4-dihydro-2,3-benzoxazine. Yield 0.95% g. (83.2%).

The free base can be converted into the hydrochloride, by treating with a solution of hydrogen chloride in diethyl ether; M.P. of the hydrochloride 198° C. with decomposition.

EXAMPLE 10

Preparation of 3-propionyl-6-chloro-1H-3,4-dihydro-2,3-benzoxazine

To a solution of 2.5 g. of 6-chloro-1H-3,4-dihydro-2,3-benzoxazine and 3.3 ml. of anhydrous triethylamine in 60 ml. of methylene chloride, a solution of 1.44 g. of propionyl chloride in 13 ml. of methylene chloride is added dropwise, at room temperature, while stirring. The reaction mixture is kept for 1 hour at room temperature, refluxed for 1 more hour, then allowed to cool. The solution is washed first with 5% hydrochloric acid, then with sodium bicarbonate, and lastly with water to neutrality. The organic phase is then dried over sodium sulphate and the solvent distilled off. The residue, consisting of 3 - propionyl-6-chloro-1H-3,4-dihydro-2,3-benzoxazine is recrystallized from 15 ml. of isopropyl ether. Yield 2.3 g. (69.2%) M.P. 61–62° C.

EXAMPLE 11

Preparation of 3-propionyl-7-chloro-1H-3,4-dihydro-2,3-benzoxazine

Prepared as described in Example 10, starting from 4.2 g. of 7-chloro-1H-3,4-dihydro-2,3-benzoxazine. Yield 4.95 g. (88.3%), M.P. 105–106° C.

EXAMPLE 12

Preparation of 3-acetyl-6-chloro-1H-3,4-dihydro-2,3-benzoxazine

Prepared as described in Example 10 starting from 5 g. of 6-chloro-1H-3,4-dihydro-2,3-benzoxazine. Yield 5.6 g. (90%), M.P. 112–14° C.

EXAMPLE 13

Preparation of 3-acetyl-7-chloro-1H-3,4-dihydro-2,3-benzoxazine

Prepared as described in Example 10 starting from 4.5 g. of 7-chloro-1H-3,4-dihydro-2,3-benzoxazine. Yield 5.2 g. (92%) M.P.

EXAMPLE 14

Preparation of 3-carbamoyl-6-chloro-1H-3,4-dihydro-2,3-benzoxazine

To a stirred suspension of 1.56 g. of sodium cyanate in 75 ml. of anhydrous toluene, 93 ml. of hydrogen chloride solution in toluene are added dropwise at −10° C. The mixture is kept at this temperature for 2 hours, then 2.7 g. of 6-chloro-1H-3,4-dihydro-2,3-benzoxazine in 42 ml. of anhydrous toluene are added. After 3 hours at −10° C. the temperature is brought to 0° and kept at this value overnight. The precipitate is collected, thoroughly washed first with toluene, then with water, and crystallized from ethanol. Yield 1.8 g. (53%), M.P. 202–204° C.

EXAMPLE 15

Preparation of 3-carbamoyl-7-chloro-1H-3,4-dihydro-2,3-benzoxazine

Prepared as described in Example 14, starting from 3.22 g. of 7-chloro-1H-3,4-dihydro-2,3-benzoxazine. Yield 52%, M.P. 206–207° C.

EXAMPLE 16

Preparation of 3-amidino-6-chloro-1H-3,4-dihydro-2,3-benzoxazine

A suspension of 3.5 g. of 6-chloro-1H-3,4-dihydro-2,3-benzoxazine hydrochloride and 0.84 g. of cyanamide in 56 ml. of anhydrous benzene are refluxed for 0.5 hour. The mixture is allowed to cool, then the solvent is distilled off. The residue is dissolved in 120 ml. of ethanol, the solution is filtered and 1.5 ml. of concentrated sulfuric acid are added, followed by 120 ml. of diethyl ether. After standing 1 hour, a precipitate is formed, which is collected and dried. This is 3-amidino-6-chloro-1H-3,4-dihydro-2,3-benzoxazine sulphate. Yield 3.7 g. (70.4%), M.P. 190° C. with decomposition.

EXAMPLE 17

Preparation of 3-amidino-7-chloro-1H-3,4-dihydro-2,3-benzoxazine

Prepared as described in Example 16, starting from 1.5 g. of 7-chloro-1H-3,4-dihydro-2,3-benzoxazine hydrochloride. Yield 1.95 g. (86.6%) of 3-amidino-7-chloro-3,4-dihydro-2,3-benzoxazine sulphate, M.P. 261° C. with decomposition.

EXAMPLE 18

Preparation of 3-nitroso-6-chloro-1H-3,4-dihydro-2,3-benzoxazine

To a solution of 0.515 g. of 6-chloro-1H-3,4-dihydro-2,3-benzoxazine hydrochloride in 8 ml. of water, previously cooled at 0° C., a solution of 0.22 g. of sodium nitrite in 3 ml. of water are added dropwise. The solution is further stirred for 10 minutes, then the formed precipitate is collected, washed with water and crystallized from isopropyl ether. An amount of 0.45 g. (90.7%) of 3-nitroso - 6 - chloro-1H-3,4-dihydro-2,3-benzoxazine is obtained, M.P. 51–52° C.

EXAMPLE 19

Preparation of 7-nitro-1H-3,4-dihydro-2,3-benzoxazine

A solution of 15.2 g. of potassium nitrate in 90 ml. of concentrated sulfuric acid is added dropwise, while stirring, at 0° C. to a solution of 19.5 g. of 3-acetyl-1H-3,4-dihydro-2,3-benzoxazine in 90 ml. of concentrated sulfuric acid. The temperature is kept for 30 minutes at 0° C. then for 30 minutes at 20° C. The mixture is poured on crushed ice and the formed precipitate extracted with methylene chloride. The extracts are washed with saturated aqueous sodium bicarbonate, dried over sodium sulphate and evaporated to dryness. The residue is refluxed 5 minutes in 175 ml. of ethanol, then an even volume of warm water is added slowly under stirring and the mixture is allowed to cool at room temperature. A solid separates which is collected by filtering and dissolved in 105 ml. of hot ethanol. An equal volume of water is added and the solution is allowed to cool. Pale yellow crystals separate consisting of 3-acetyl-7-nitro-1H-3,4-dihydro-2,3-benzoxazine. Yield 7.6 g. (31%); M.P. 194–197° C.

A suspension of 0.5 g. of 3-acetyl-7-nitro-1H-3,4-dihydro-2,3-benzoxazine in 10 ml. of 18% HCl is refluxed for 4 hours. After concentrating the residue is taken up with cold water and the suspension is adjusted at pH 8 with saturated aqueous sodium bicarbonate. The precipitate, consisting of 7-nitro-1H-3,4-dihydro-2,3-benzoxazine is collected and crystallized from ethanol. Yield 0.48 g. (97%); M.P. 168–169° C.

EXAMPLE 20

Preparation of 6-nitro-1H-3,4-dihydro-2,3-benzoxazine

The combined hydroalcoholic mother liquors of Example 20, from which 3-acetyl-7-nitro-1H-3,4-dihydro-2,3-benzoxazine had been crystallized, are stored for 1 hour at 0° C. and the formed precipitate is collected to give 3.35 g. (13.5%) of 3-acetyl-6-nitro-1H-3,4-dihydro-2,3-benzoxazine. M.P. 119–120° C.

The free base 6-nitro-1H-3,4-dihydro-2,3-benzoxazine is obtained according to the same method described for the 7-nitro derivative. Yield 90%; M.P. 128° C.

EXAMPLE 21

Preparation of 3-(2-diethylaminoethyl)-6-nitro-1H-3,4-dihydro-2,3-benzoxazine

A suspension of 0.9 g. of 6-nitro-1H-3,4-dihydro-2,3-benzoxazine, 1.05 g. of anhydrous potassium carbonate, 1.05 g. of 1-diethylamino-2-chloroethane in 5 ml. of diethylketone are refluxed for 5 hours. After cooling the solvent is evaporated, and the residue is taken up with water and dilute hydrochloric acid. The solution is filtered, and the filtrate made alkaline with 10% sodium hydroxide. A precipitate is formed, which is extracted with diethyl ether. The organic phase is washed with water, dried over sodium sulphate, and the solvent evaporated in vacuo. The residue is distilled in vacuo to give 0.35 g. (25.1%) of 3-(2-diethylaminoethyl)-6-nitro-1H-3,4-dihydro-2,3-benzoxazine.

The free base can be converted into the corresponding hydrochloride by dissolving it in diethyl ether and precipitating with hydrogen chloride. 3-(2-diethylaminoethyl)-6-nitro-1H - 3,4 - dihydro-2,3-benzoxazine hydrochloride, M.P. 164–166° C.

EXAMPLE 22

Preparation of 3-phenethyl-7-nitro-1H-3,4-dihydro-2,3-benzoxazine

Prepared substantially as described in Example 3, starting from 3.6 g. of 7-nitro-1H-3,4-dihydro-2,3-benzoxazine and 4.07 g. of 2-bromethylbenzene. Yield 1.35 g. (23.7%) M.P. 120–121° C.

EXAMPLE 23

Preparation of 3-(4-pyridinoethyl)-7-nitro-1H-3,4-dihydro-2,3-benzoxazine

Prepared as described in Example 5, from 1.8 g. of 7-nitro-1H-3,4-dihydro-2,3-benzoxazine and 1.16 g. of 4-vinyl-pyridine. The hydrochloride is obtained. Yield 2.9 g.

of 3-(4-pyridinoethyl)-7-nitro-1H-3,4-dihydro-2,3-benzoxazine hydrochloride (90.5%), M.P. 210° C. with decomposition.

EXAMPLE 24

Preparation of 3-methyl-6-nitro-1H-3,4-dihydro-2,3-benzoxazine

Prepared as described in Example 3, from 10.5 g. of 6-nitro-1H-3,4-dihydro-2,3-benzoxazine. Yield 7.9 g. (70%), M.P. 112–114° C.

EXAMPLE 25

Preparation of 3-methyl-7-nitro-1H-3,4-dihydro-2,3-benzoxazine

Prepared as in Example 3, from 10 g. of 7-nitro-1H-3,4-dihydro-2,3-benzoxazine. Yield 4.7 g. (43.7%), M.P. 163–165° C.

EXAMPLE 26

Preparation of 3-(2-hydroxyethyl)-7-nitro-1H-3,4-dihydro-2,3-benzoxazine

Prepared as described in Example 6, from 9 g. of 7-nitro-1H-3,4-dihydro-2,3-benzoxazine. Yield 8.2 g. (73%), M.P. 109–110° C.

EXAMPLE 27

Preparation of 3-(2-carbamoyloxyethyl)-7-nitro-1H-3,4-dihydro-2,3-benzoxazine

Prepared as described in Example 7, from 1 g. of 3-(2-hydroxyethyl)-7-nitro-1H-3,4-dihydro-2,3-benzoxazine. Yield 0.55 g. (46.6%), M.P. 139–140° C.

EXAMPLE 28

Preparation of 3-(2-chloroethyl)-7-nitro-1H-3,4-dihydro-2,3-benzoxazine

Prepared as described in Example 8, from 7.7 g. of 3-(2-hydroxyethyl)-7-nitro-1H-3,4-dihydro-2,3-benzoxazine. Yield 8.2 g. (98%), M.P. 97–98° C.

EXAMPLE 29

Preparation of 3-(2-diethylaminoethyl)-7-nitro-1H-3,4-dihydro-2,3-benzoxazine

Prepared as described in Example 9, from 1 g. of 3-(2-chloroethyl)-7-nitro-1H-3,4-dihydro-2,3-benzoxazine and 8 ml. of diethylamine. Yield 0.30 g. (26.0%).

The hydrochloride is prepared by treating the base dissolved in diethyl ether with hydrogen chloride, M.P. 110° C. with decomposition.

EXAMPLES 30–33

The following compounds are prepared substantially as described in Example 10.

| Compound | Yield, percent | M.P., °C. |
|---|---|---|
| 3-acetyl-6-nitro-1H-3,4-dihydro-2,3-benzoxazine | 70 | 119–120 |
| 3-acetyl-7-nitro-1H-3,4-dihydro-2,3-benzoxazine | 75 | 194–196 |
| 3-propionyl-7-nitro-1H-3,4-dihydro-2,3-benzoxazine | 88 | 162–163 |
| 3-(4-isobutylphenylacetyl)-7-nitro-1H-3,4-dihydro-2,3-benzoxazine | 77,7 | 133–135 |

EXAMPLE 34

Preparation of 3-carboanilino-6-nitro-1H-3,4-dihydro-2,3-benzoxazine

To a solution of 0.9 g. of 6-nitro-1H-3,4-dihydro-2,3-benzoxazine in 40 ml. of benzene 0.655 g. of phenyl isocyanate are added. The solution is allowed to stand at room temperature for 3 hours, then the formed crystals are collected by filtration, washed with benzene and dried. An amount of 1.15 g. (77%) of 3-carboanilino-6-nitro-1H-3,4-dihydro-2,3-benzoxazine is obtained, M.P. 185–186° C.

EXAMPLE 35

Preparation of 3-nitroso-6-nitro-1H-3,4-dihydro-2,3-benzoxazine

Prepared as described in Example 18, from 0.18 g. of 6-nitro-1H-3,4-dihydro-2,3-benzoxazine. Yield 0.2 g. (96%), M.P. 123–125° C.

EXAMPLE 36

Preparation of 3-methyl-6-amino-1H-3,4-dihydro-2,3-benzoxazine

An amount of 2 g. of 3-methyl-6-nitro-1H-3,4-dihydro-2,3-benzoxazine dissolved in 70 ml. of ethanol are hydrogenated at room temperature in the presence of 0.8 g. of 5% palladium on charcoal as the catalyst. The suspension is then filtered, concentrated to 10 ml. in vacuo and cooled on ice. Crystals are formed of 3-methyl-6-amino-1H-3,4-dihydro-2,3-benzoxazine, which are collected and recrystallized from ethanol. Yield 1.15 g. (68%), M.P. 117–118° C.

EXAMPLES 37–40

The following compounds are prepared by substantially the same process described in Example 36.

| Compound | M.P., °C. | Yield percent |
|---|---|---|
| methyl-7-amino-1H-3,4-dihydro-2,3-benzoxazine | 170–171 | 65 |
| 3-acetyl-6-amino-1H-3,4-dihydro-2,3-benzoxazine | 154–155 | 77 |
| 3-acetyl-7-amino-1H-3,4-dihydro-2,3-benzoxazine | 143–144 | 79 |
| 3-(4-isobutylphenylacetyl)-7-amino-1H-3,4-dihydro-2,3-benzoxazine | [1] 199–200 | 66.5 |

[1] Hydrochloride.

EXAMPLE 41

Preparation of 7-amino-1H-3,4-dihydro-2,3-benzoxazine

Two grams of 3-acetyl-7-amino-1H-3,4-dihydro-2-3-benzoxazine are refluxed in 30 ml. of 18% hydrochloric acid. After cooling the formed crystals of 7-amino-1H-3,4-dihydro-2,3-benzoxazine dihydrochloride are collected by filtering and crystallized from 80% ethanol.

The free base is isolated by contacting an aqueous solution of the above dihydrochloride with a saturated sodium carbonate aqueous solution. Yield 1.25 g. (80%); M.P. 151–152° C.

EXAMPLE 42

Preparation of 6-amino-1H-3,4-dihydro-2,3-benzoxazine

It is prepared according to the method described in Example 41. Yield 86%; M.P. 155–156° C.

We claim:
1. A compound of the formula

wherein R is a member of the class consisting of hydrogen, lower alkyl, phenyl lower alkyl, and hydroxy-lower alkyl, and $R_1$ is linked to the benzene ring in position 6- or 7-, and is selected from the group consisting of halogen, nitro and amino.

2. A compound as in claim 1 wherein the benzoxazine is 3-methyl-7-chloro-1H-3,4-dihydro-2,3-benzoxazine.

3. A compound as in claim 1 wherein the benzoxazine is 3-methyl-6-amino-1H-3,4-dihydro-2,3-benzoxazine.

4. A compound as in claim 1 wherein the benzoxazine is 3-methyl-7-amino-1H3-,4-dihydro-2,3-benzoxazine.

5. A compound as in claim 1 wherein the benzoxazine is 6-chloro-1H-3,4-dihydro-2,3-benzoxazine.

6. A compound as in claim 1 wherein the benzoxazine is 7-chloro-1H-3,4-dihydro-2,3-benzoxazine.

7. A compound as in claim 1 wherein the benzoxazine is 6-nitro-1H-3,4-dihydro-2,3-benzoxazine.

8. A compound as in claim 1 wherein the benzoxazine is 7-nitro-1H-3,4-dihydro-2,3,benzoxazine.

9. A compound as in claim 1 wherein the benzoxazine is 6-amino-1H-3,4-dihydro-2,3-benzoxazine.

10. A compound as in claim 1 wherein the benzoxazine is 7-amino-1H-3,4-dihydro-2,3-benzoxazine.

References Cited

UNITED STATES PATENTS 3,058,980  10/1962  Berg _____ 260—244 R
3,418,317  12/1968  Pifferi et al. _____ 260—244 R

FOREIGN PATENTS 866,433  4/1961  Great Britain _____ 260—244 R

OTHER REFERENCES

Pifferi et al.: Gazz. Chim. Ital., vol. 96, pp. 1671–95 (1966).

Pifferi et al.: Chem. Abstr., vol. 67, No. 43766e (1967).

Wagner et al.: Synthetic Organic Chemistry, pp. 654–7 N.Y., Wiley, 1953.

NATALIE TROUSOF, Primary Examiner

U.S. Cl. X.R.

260—141; 424—248